United States Patent

Breslau et al.

(10) Patent No.: US 7,511,631 B1
(45) Date of Patent: Mar. 31, 2009

(54) ADAPTIVE HIDING/UNHIDING OF A DEVICE

(75) Inventors: Franklin C. Breslau, Teaneck, NJ (US); David B. Kumhyr, Austin, TX (US); Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/127,633

(22) Filed: May 27, 2008

(51) Int. Cl.
*G08B 5/22* (2006.01)
*G09F 9/33* (2006.01)

(52) U.S. Cl. .............. 340/815.45; 250/208.1; 472/61; 428/919

(58) Field of Classification Search .............. 340/815.4, 340/815.45, 815.65; 250/205, 208.1, 208.2; 348/122, 586; 472/61; 359/618; 385/116, 385/118, 119; 428/919; 362/253; 345/30, 345/83
See application file for complete search history.

(56) References Cited

U.S. PATENT DOCUMENTS

| | | | |
|---|---|---|---|
| 2,369,421 A | 2/1945 | Warren | |
| 5,220,631 A * | 6/1993 | Grippin | 385/115 |
| 5,307,162 A * | 4/1994 | Schowengerdt | 348/122 |
| 6,333,726 B1 * | 12/2001 | Bettinger | 345/87 |
| 6,338,292 B1 * | 1/2002 | Reynolds et al. | 89/36.02 |
| 6,459,076 B1 * | 10/2002 | Schlenker | 250/205 |
| 6,888,322 B2 | 5/2005 | Dowling et al. | |
| 7,132,635 B2 | 11/2006 | Dowling | |
| 7,206,131 B2 * | 4/2007 | Alden | 359/618 |
| 7,211,959 B1 | 5/2007 | Chou | |
| 7,253,790 B2 | 8/2007 | Kirkland et al. | |
| 7,301,469 B1 * | 11/2007 | Hoffman et al. | 340/815.54 |
| 7,425,946 B1 * | 9/2008 | Britton | 345/168 |
| 2002/0117605 A1 * | 8/2002 | Alden | 250/208.1 |
| 2007/0132664 A1 * | 6/2007 | Weissman | 345/30 |
| 2008/0062706 A1 | 3/2008 | Feldmeier | |

* cited by examiner

*Primary Examiner*—Ben Lee
*Assistant Examiner*—Travis R Hunnings
(74) *Attorney, Agent, or Firm*—Anna L. Linne; Suiter Swantz pc llo

(57) ABSTRACT

The present disclosure is a method for modifying a color of a device. Method may include receiving a signal, identifying a color scheme of an immediate area, changing a color of a device to substantially conform to the immediate color scheme; and changing a color of the device to a substantial color other than the immediate color scheme.

1 Claim, 1 Drawing Sheet

ADAPTIVE HIDING/UNHIDING OF A DEVICE

TECHNICAL FIELD

The present disclosure generally relates to the field of cloaking and revealing of physical objects, and more particularly to a method of using organic light emitting diodes (OLEDs) to hide physical objects when these objects are in a risky environment or to make physical objects more visible when these objects are in a less visible environment.

BACKGROUND

In the age of multiple mobile devices, such as music players, cell phones, and the like, the ability to quickly locate these devices is desirable. However, mobile devices may also be stolen easily when the devices are left in a visible environment. Therefore, being able to camouflage these devices in an environment is also desirable.

SUMMARY

The present disclosure is directed to a method for modifying a color of a device. Method may include receiving a signal, identifying a color scheme of an immediate area, changing a color of a device to substantially conform to the immediate color scheme; and changing a color of the device to a substantial color other than the immediate color scheme.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
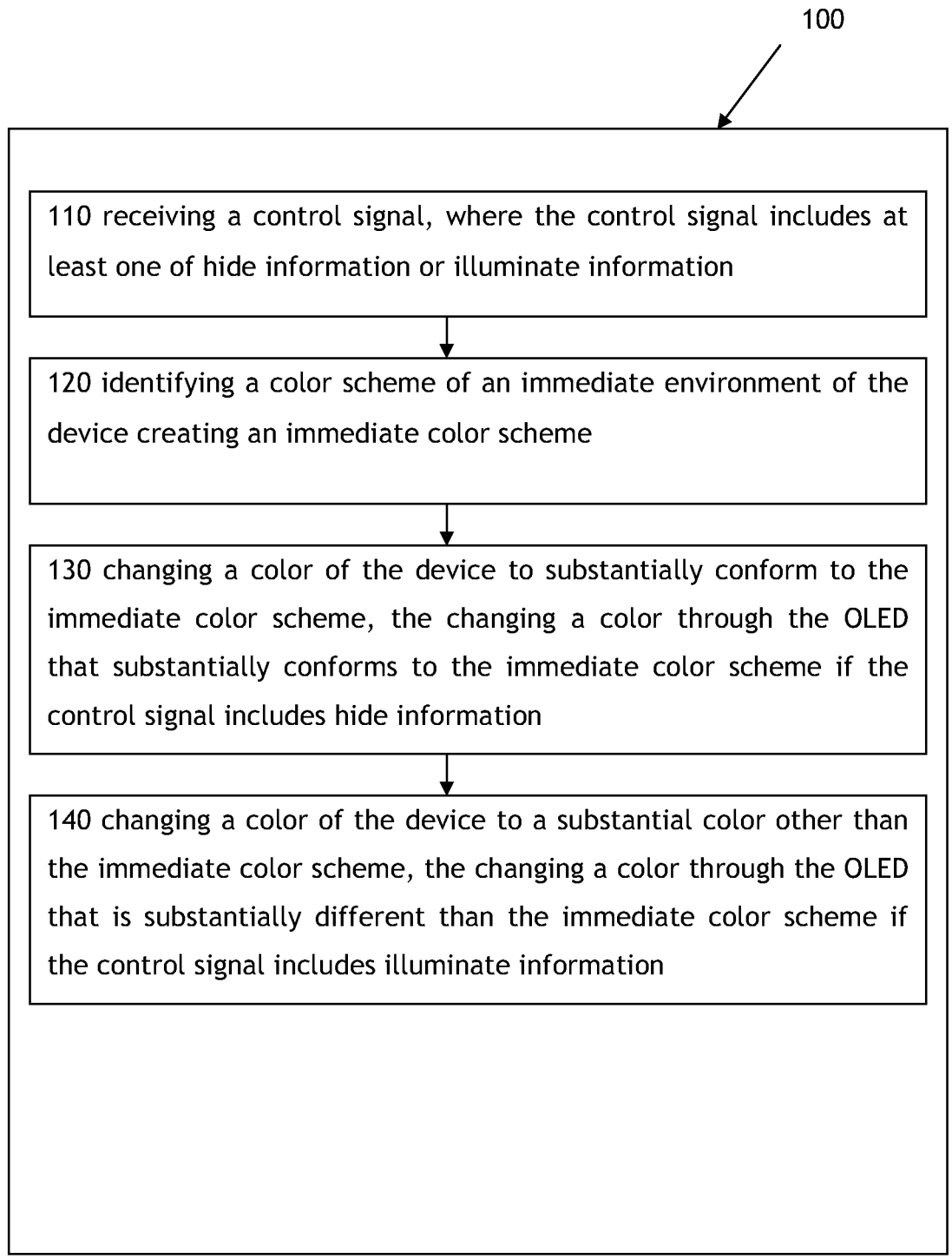
FIG. 1 is a flow diagram of a method for modifying a color of a device.

Reference will now be made in detail to the subject matter disclosed, which is illustrated in the accompanying drawings.

The present application discloses a method for modifying a color of a device. For example, method for modifying a device may be executed by a display skin to make devices less visible when the devices are in a risky environment and make devices more visible when desired. The display skin may be configured with one or more organic light emitting diodes.

Referring to FIG. 1, a flow diagram of a method 100 for modifying a color of a device is shown. Method 100 may include receiving a control signal 110. Control signal may include at least one of hide information or illuminate information. Method 100 may include identifying a color scheme of the immediate environment surrounding the device. It is contemplated that identification of an immediate color scheme may be performed by a proximity sensor enclosed by a display skin. Method 100 may include changing color of the device to substantially conform to the immediate color scheme. Changing the color occurring through the organic light emitting diodes that substantially conforms to the immediate color scheme may be performed when the control signal includes hide information. Method 100 may include changing color of the device to a substantial color other than the immediate color scheme 140. Changing the color to a substantial color other than the immediate color scheme may be performed by organic light emitting diodes when the control signal includes illuminate information.

Method 100 may be performed by a display skin. Display skins together with control devices may be tagged to various items or various items may be made using display skins. This allows for increasing or decreasing the visibility of the items based on need or time lapse. For example, car keys may be made visible when a device receives a signal to increase visibility by turning on an OLED. Similarly, clothing, wallets, papers, tickets and the like can be externally tagged so that activation allows the user to ensure that "nothing has been left behind" when checking out of a hotel room or the like.

The display skin may determine a general scheme of the surrounding area by implementing a light sensor with a contact switch on each side of the skin. When the item is covered by the display skin, the contact switch may be able to determine what side the item was placed down on. The light sensor on the side that is not on the surface will identify the light intensity and color that shines on the display skin. The OLED on the side placed on the surface will then emit the same intensity and color of light that the light sensor previously detected. The reflected light from the surface may reach the light sensor that is on the surface, determining the color and intensity of the surface. When the device needs to be hidden, the color and intensity of the light illuminated by the display skin may be the color and intensity of the reflected light from the surface the display skin was placed down on. When trying to unhide the device, the inverse of the reflected light from the surface will be illuminated by the display skin.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method of modifying color of a device, comprising:
receiving a control signal, where the control signal includes at least one of hide information or illuminate information;
identifying a color scheme of an immediate environment of the device creating an immediate color scheme;
changing a color of the device to substantially conform to the immediate color scheme, the changing a color through an organic light emitting diode that substantially conforms to the immediate color scheme if the control signal includes hide information; and
changing a color of the device to a substantial color other than the immediate color scheme, the changing a color through organic light emitting diodes is substantially different than the immediate color scheme if the control signal includes illuminate information.

* * * * *